United States Patent [19]

Stanzel et al.

[11] Patent Number: 4,733,057
[45] Date of Patent: Mar. 22, 1988

[54] SHEET HEATER

[75] Inventors: Erwin K. E. Stanzel, Linsengericht, Fed. Rep. of Germany; Chester L. Sandberg, Palo Alto, Calif.

[73] Assignee: Raychem Corporation, Menlo Park, Calif.

[21] Appl. No.: 853,783

[22] Filed: Apr. 18, 1986

[30] Foreign Application Priority Data

Apr. 19, 1985 [GB] United Kingdom ............... 8510058
Oct. 1, 1985 [GB] United Kingdom ............... 8524188
Jan. 28, 1986 [GB] United Kingdom ............... 8601982

[51] Int. Cl.⁴ .......................... H05B 3/10; H01C 7/10
[52] U.S. Cl. .................................... 219/548; 219/213; 219/345; 219/528; 219/529; 219/541; 219/504; 219/505; 219/549; 252/511; 252/540; 338/22 R; 338/212; 338/214
[58] Field of Search ............... 219/213, 345, 528, 529, 219/541, 548, 549, 504, 505; 252/511, 540; 338/22 R, 212, 214

[56] References Cited

U.S. PATENT DOCUMENTS

| | | | |
|---|---|---|---|
| 2,762,896 | 9/1956 | Pendleton | 219/19 |
| 3,317,657 | 12/1960 | Eisler | 219/549 |
| 3,535,494 | 10/1970 | Armbruster | 219/528 |
| 3,697,728 | 10/1972 | Stirzenbecher | 219/548 |
| 4,330,703 | 5/1982 | Horsma et al. | 219/553 |
| 4,425,497 | 1/1984 | Leary et al. | 219/544 |

FOREIGN PATENT DOCUMENTS

| | | |
|---|---|---|
| 2237393 | 2/1975 | France . |
| 2260248 | 8/1975 | France . |
| 860213 | 2/1961 | United Kingdom . |
| 1144846 | 3/1969 | United Kingdom . |

OTHER PUBLICATIONS

Condensed Chemical Dictionary, G. Hawley, 9th Ed., 77, p. 386.

Primary Examiner—Clifford C. Shaw
Assistant Examiner—Gerald E. Preston
Attorney, Agent, or Firm—Timothy H. P. Richardson; Herbert Burkard

[57] ABSTRACT

A wall, floor or ceiling heater comprises a plurality of self regulating, preferably PTC conductive polymer, heater elements each of which is connected to two or more connection elements. The elements are held by a support. In a preferred embodiment the heater elements are positioned parallel to each other, and perpendicular to the connection elements. The support is preferably made from a rigid material which is hinged to allow the heater to be folded or rolled for easy transport.

18 Claims, 11 Drawing Figures

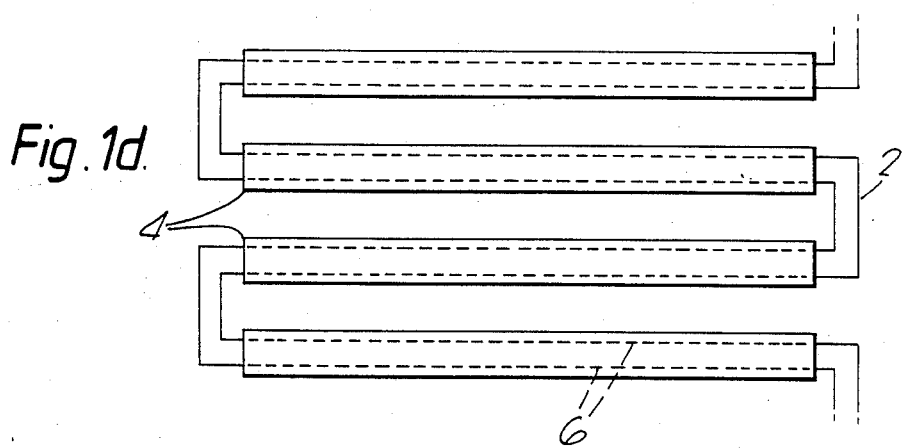
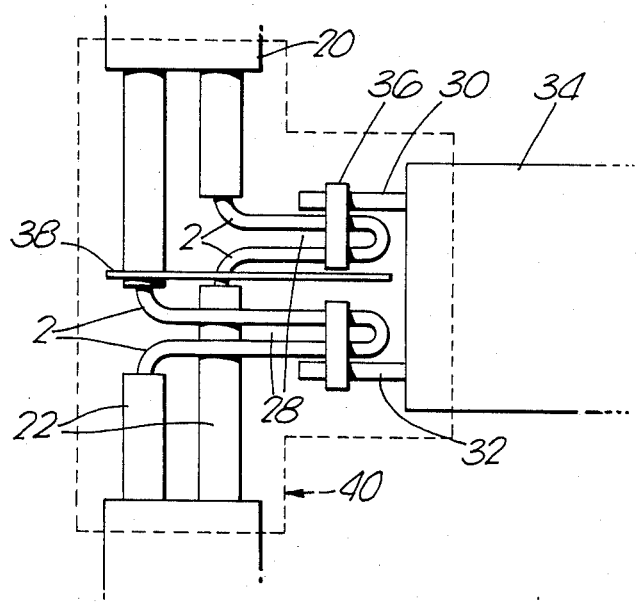
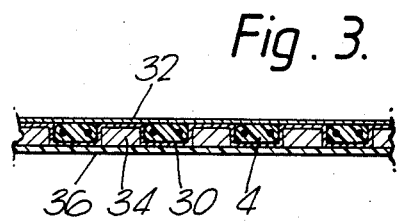
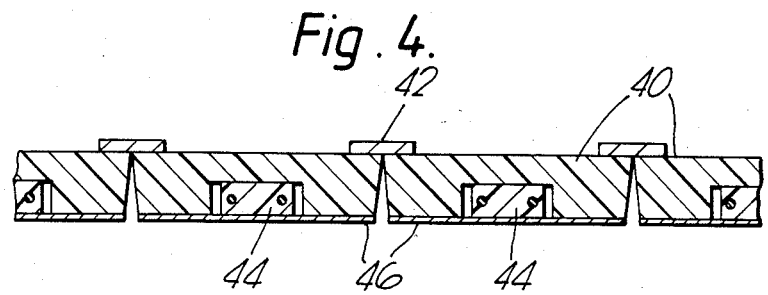

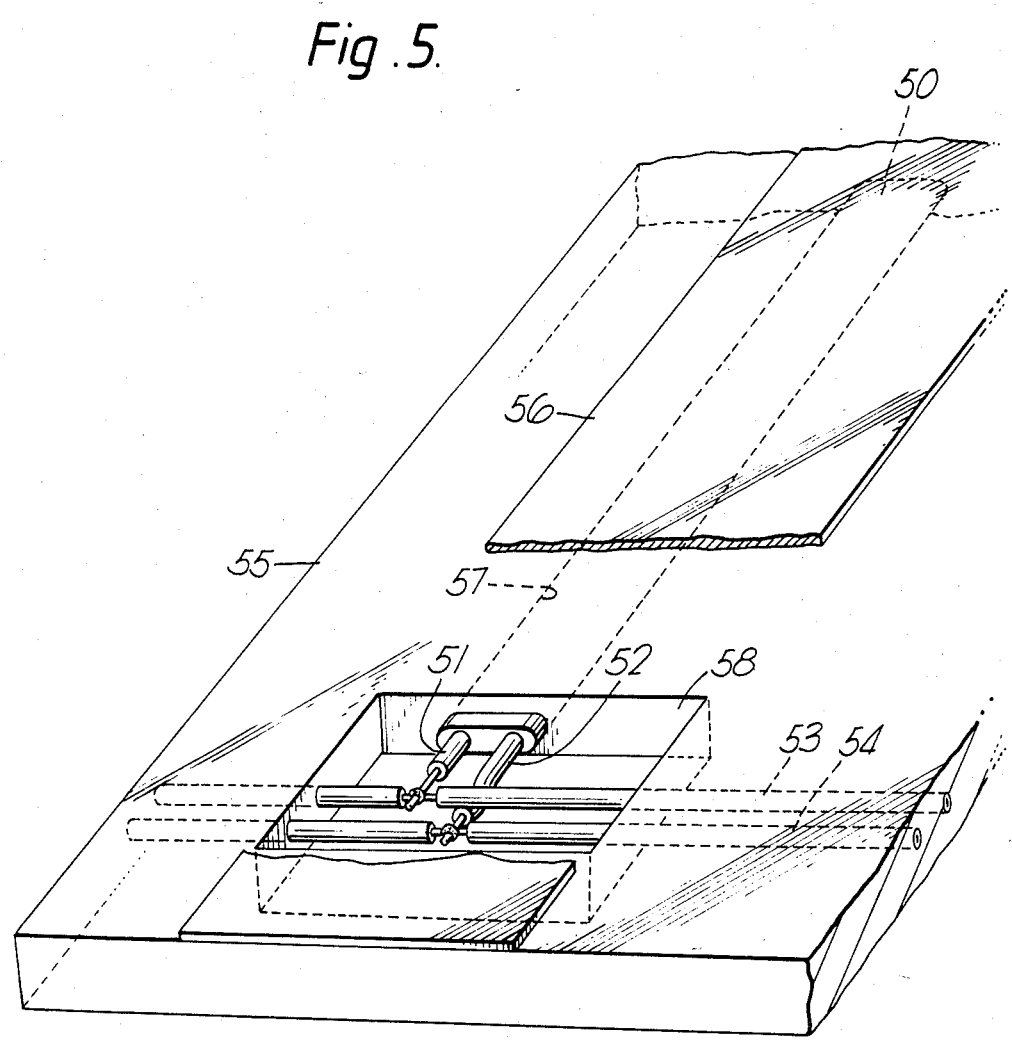

SHEET HEATER

The present invention relates to wall, floor and ceiling heaters.

It is known to install electrically powered heater elements in the walls, floor or ceiling of a room (i.e. in room panels) in order to provide an unobtrusive and controllable means of heating the room. Generally, the heating elements are installed in the room panel on construction of the room, often under a layer of a grout which provides protection for the elements, for example from mechanical abuse or spillage of hazardous fluids. The installation of the elements under a layer of a grout material is time consuming; furthermore the weight and volume of the installed heater require that the room be planned ab initio, to accomodate the wall, floor or ceiling heating, and generally preclude the subsequent installation of such heaters in a completed construction, for example during renovation. Servicing and/or replacement of the heater elements can involve extensive reconstruction.

A further disadvantage associated with many of the systems of the prior art is that the heater elements have to be electrically interconnected on site, which further lengthens the installation time, and increases the expense, and the chances of error on installation.

The present invention provides a wall, floor or ceiling heater which can be fitted in a room during or after construction, and which obviates problems associated with prior art heaters.

According to the invention, there is provided a wall, floor or ceiling heater, the heater having the form of a sheet and comprising a plurality of elongate self-regulating electrical heater elements, each of which is connected to at least two connection elements, and a support to hold the heater elements and the connection elements in a substantially fixed spatial relationship in the plane of the sheet.

The self-regulating properties of the heater elements of the heater confer several advantages. Firstly, the heat output of the heater is variable according to requirements in any part of a room; thus, more heat can be given out in the colder parts of a room such as in the vicinity of windows, and less heat can be given out in the warmer parts of a room. Secondly, the heater is safer and more reliable in use than comparable constant wattage heaters since the heater elements are unable to overheat. Thus the likelihood of the elements burning out is significantly reduced. Furthermore, furniture, wall hangings and other insulating fittings can be placed on or against the heater without risk of overheating, which allows more flexibility in the laying out of the furniture etc.

The heater being in sheet form makes installation and servicing more convenient. The present heater can be installed after construction of a room, for example as a carpet or wall-covering, with a layer of an appropriate facing material where necessary. The facing material may serve to protect the heater for example from mechanical abuse or from fluids or other chemical agents, or it may serve an aesthetic function, for example to enhance the visual appearance of the heater.

Preferably, the self-regulating heater elements comprise a material which exhibits PTC behaviour, particularly a PTC conductive polymer which comprises a polymeric component and, dispersed therein, a particulate conductive filler, particularly carbon black. Known self-regulating heater elements are suitable for this purpose, including in particular conventional conductive polymer strip heaters which comprise two conductors embedded in a melt-extruded strip of a PTC conductive polymer. Also suitable are the sheet heaters disclosed in European Patent Application No. 85300415.8 and in U.S. Ser. Nos. 650,918, 650,919, and 650,920. PTC conductive polymers and electrical devices, including self-regulating heaters, comprising PTC conductive polymers are for example disclosed in U.S. Pat. Nos. 2,952,761, 2,978,665, 3,243,753, 3,351,882, 3,571,777, 3,757,086, 3,793,716, 3,823,217, 3,858,144, 3,861,029, 4,017,715, 4,072,848, 4,085,286, 4,117,312, 4,177,376, 4,177,446, 4,188,276, 4,237,441, 4,242,573, 4,246,468, 4,250,400, 4,255,698, 4,271,350, 4,272,471, 4,309,596, 4,309,597, 4,314,230, 4,315,237, 4,318,881, 4,327,351, 4,220,704, 4,334,148, 4,334,351, 4,361,799, 4,388,607, 4,425,497, 4,426,339, 4,426,633, 4,427,897, 4,429,216, 4,435,639, 4,442,139, 4,459,473, 4,481,498, 4,473,450 and 4,502,929; UK Pat. No. 1,605,005; J. Applied Polymer Science 19, 813–815 (1975), Klason and Kubat: Polymer Engineering and Science 18, 649–653 (1978), Narkis et al; German OLS Nos. 2,634,999, 2,746,602, 2,821,799, and European Patent Application Publication Nos. 38,713, 38,714, 38,718, 63,440, 68,688, 74,281, 92,406, 96,492, 119807 and 128664 and European Patent Applications Nos. 8407984.9, 84305584.7, 84306456.9 and 84307984.9. The disclosure of each of the patents, publications and applications referred to above is incorporated herein by reference.

Generally, the elongate heater elements used in the present heater will comprise a strip or layer, preferably a melt-extruded strip or layer, of a conductive polymer which exhibits PTC behaviour, having embedded therein, or secured, eg. deposited, thereon, two or more electrodes, for example interdigitated electrodes printed on the surface of a conductive polymer layer or two elongate parallel electrodes which extend generally parallel along the element. Especially preferred are elongate strip heaters, which have a generally flattened, tape-like cross-section. The heating elements are preferably laid flat along their entire length.

It is advantageous to use parallel circuit heater elements in the present heater, since this allows the heater to be cut to fit the situation in which it is to be installed. The way in which the heater can be cut to fit depends on the layout of the heater elements and connection elements. For example, heaters which comprise substantially parallel heater elements with connection elements running perpendicular thereto, can be cut along any line substantially parallel to the heater elements. Heaters in which the heater elements are connected to the connection elements at one end of each heater element can also be cut to fit along a line substantially perpendicular to the heater elements. In this case, the ends of the heater elements that are exposed by cutting should be sealed for safety, and to prevent the formation of a short circuit between the exposed electrodes.

The heater can be manufactured and supplied in standard widths, such as 0.4 m or less, 0.8 m, 1.0 m, 1.5 m, 2.0 m and more.

The configuration of the heater elements of the heater will depend on the application to which the heater is to be put. For many applications a generally square or rectangular configuration will be appropriate. In such a configuration, the heater elements preferably extend generally parallel in a first direction. The connection elements preferably extend perpendicular to that direction. Other configurations are however possible; these include radial configurations in which a number of heater elements radiate from a single point, or are connected to two points. Preferably however, the heater elements are spaced apart along their entire length.

The connection elements and the heater elements are in a substantially fixed spatial relationship, and this makes easier the task of installing the heater, since it is not necessary to assemble and to interconnect the various components on site. Preferably, the heater is flexible, at least around one axis, which advantageously allows the heater to be folded or rolled temporarily for ease of transportation. For example in a heater comprising a plurality of generally parallel heater elements, and connection elements extending perpendicular thereto, the heater may be flexible about an axis which is parallel to the heater elements. It will be understood that the heater elements and connection elements of a flexible heater will nevertheless be in a substantially fixed spatial relationship within the plane of the sheet when the heater is laid flat, or installed on a wall, floor or ceiling.

The present heaters, when installed, can be arranged to have a low profile and to be light in weight. For example, the installed heater can be arranged to have a thickness of less than 1 cm, and a weight of less than 500 g/m$^2$, for example 250 g/m$^2$. The low profile of the heaters can be achieved by using tape-like heater elements which have a flattened cross-section, laid flat (that is on a principle surface of the tape) along their length. The present heater construction is in contrast to those of the prior art, in which the heater elements are installed under several centimetres of a grout such as concrete; the low profile and light weight of the present system make it particularly suitable for use as a retrofit system, in rooms in which the use of a wall, floor or ceiling heaters had not initially been intended. For example, the heater may be installed as a carpet layer, a wall covering or in a skirting board.

Each of the heater elements is electrically connected directly to at least two connection elements. The connection elements may be in the form of bus bars extending along one or more edges of the heater. For example, the heater may have a comb configuration, in which two bus bars are provided along one edge of the sheet, to which the two elongate electrodes of each heater element which is preferably in the form of a tape, can be connected. at the same end of each element. Alternatively, one or more bus bars may be provided along each of two opposite edges between which the heater elements are located; two electrodes in each heater element may then be connected to a respective bus bar at opposite ends of the element. This can be seen as a ladder configuration. Instead of employing a pair of connection elements to which substantially all of the heating elements are connected, a heater can be constructed in which a pair of connection elements interconnects less than all of the elements; for example, a separate pair of connection elements can be used to interconnect each adjacent pair of heater elements. In the latter case, each heater element can be connected at the same end to both of its adjacent heater elements, or it can be connected to one of its adjacent heater elements at each end.

In a particularly preferred construction, the support can be extruded around the connection elements so that the support itself can comprise the electrical insulation for the elements. The connection elements may however be pre-coated with a suitable temperature resistant insulation.

There are many factors to be taken into account when deciding on the wiring layout. For example, in some circumstances, it may be advantageous to construct the heater with all of the connection elements extending along one edge, since the width of the heater can then be cut to fit the particular application. The cut-to-fit facility arises from the parallel circuitry of the heater elements. In other circumstances, it may be advantageous to interconnect the heater elements by means of connection elements at each end of the heater elements, since the connections can be arranged such that there are no points at which either connection elements or electrodes cross over; the heater can therefore be arranged to have a lower profile. In some circumstances, it is advantageous to arrange the connection elements such that substantially all of the heater elements are connected to one pair, since this minimises the number of ends of electrodes and connection elements to be connected. Electrical connections can be made, for example by crimping to a stripped portion of the connection element which may be an end portion or a portion between the ends of the conductor, by an insulation piercing stud on a printed circuit board, by welding or by soldering. Other means of effecting the electrical connection will be apparent to those skilled in the art. Insulation of the electrical connection may be effected in any of several ways, for example by use of a heat-shrinkable tubular or appropriately moulded part, or by use of an encapsulating gel as disclosed in GB-A-2133026 the disclosure of which is incorporated herein by reference. In another configuration, which may have considerable advantages in manufacturing the heater, the support may be extruded around the connection elements; recesses may be provided at intervals in the support exposing short lengths of connection elements for connection to the heater elements. After connection of the heater elements the recesses may be filled with an appropriate insulation material, for example a gel, or a hardening or curing resin, for example an epoxy or polyurethane potting compound.

The nature of the support for the heater elements will depend on the application to which the heater will be put. In one embodiment the support comprises a sheet material having a thermal conductivity of at least 50 W/mK. In one embodiment the support comprises a sheet or strip of material, the material supporting the heater elements on at least one of its principle surfaces. In another embodiment, the heater elements may be sandwiched between two laminated supporting sheets of material. The laminated sheets may be fixed together, for example by an adhesive, rivets, screws etc. The support preferably provides mechanical protection for the heater elements. One of the sheets may comprise one or more strips or tapes. Alternatively, or in addition, the support may comprise a layer of material, which the heater elements may be embedded in, or laid upon. The support may comprise rigid or resilient material, for example a foam material, rigid sheets of polyamide or polyester, fibrous sheets etc. A component of the support, particularly in strip form, may be used as a spacer between the heater elements to ensure that the principal surfaces of the heater are substantially even and to support loads placed against the heater. Alternatively, strips of support material may be placed such that adjacent strips abut, and furthermore the abutting edges may be hinged to allow the heater to be rolled or folded. The hinge may be provided by an adhered film. When the support comprises hinged strips of material, the heater elements are preferably embedded in grooves in the strips. In the latter construction, the connection elements may extend perpendicular to the hinge and in such circumstances it may be desirable to provide the connection elements with a kink or bend in the region of the hinge to facilitate bending of the connection element when the heater is rolled up. Such a kink or bend may be produced by appropriate in-line manufacturing techniques if the support is extruded around the connection elements. Preferably, a sheet of a metal, or of a material having a thermal conductivity of at least 30 W/mK, is incorporated into the heater to ensure that heat is dissipated more evenly over the area of the heater. Aluminium is preferred for its light weight. The aluminium (or other conductive material) may be incorporated as a foil, for example by adhering to the sheet on which the heater elements are mounted, or the sheet may itself comprise aluminium. A metal member, incorporated for heat transfer properties, may also be used as an electrical grounding layer; alternatively or in addition, a woven or braided layer, or a layer of another electrically conductive material may be used for this purpose. To protect the heater elements further, or to provide a more comfortable floor or wall covering, a resilient material may be incorporated into the heater construction, either across the whole heater, or to protect only selected areas, such as the heater elements. When appropriate and/or desirable, a layer of material may be incorporated into the support for for aesthetic reasons, for example to provide decoration for the room to to be heated.

The heater may include, or be adapted to interface with, control equipment such as thermostats and timer equipment.

Embodiments of the invention will be described with reference to the accompanying Drawings, in which:

FIGS. 1a, b, c and d show schematically different configurations of heater elements for a wall, floor or ceiling heater of the invention;

FIG. 2 shows the nature of electrical connections which can be employed in the heater of FIG. 1a;

FIG. 3 shows a cross-section through a heater construction in which the configuration of the heater elements is as shown in FIG. 1a; and FIG. 4 shows a corss-section through an alternative construction of heater.

FIG. 5 shows a plan view partly in section of a further construction of heater with co-extruded connection elements.

Figure 1A:
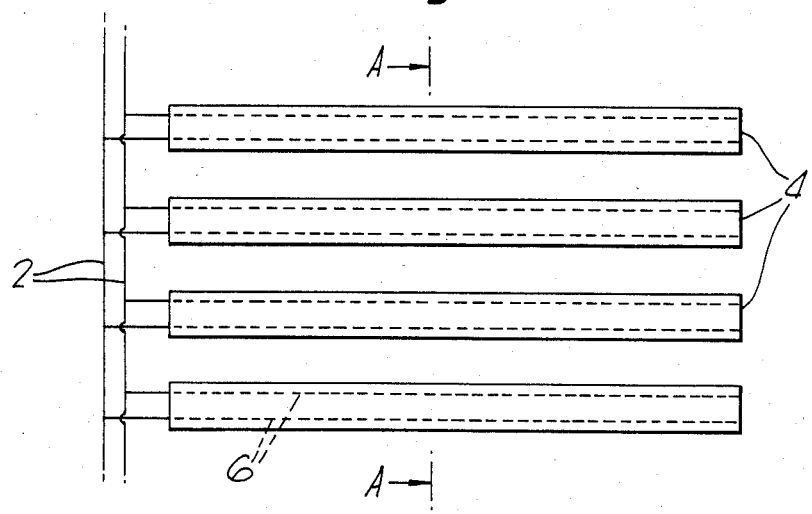
Figure 1B:
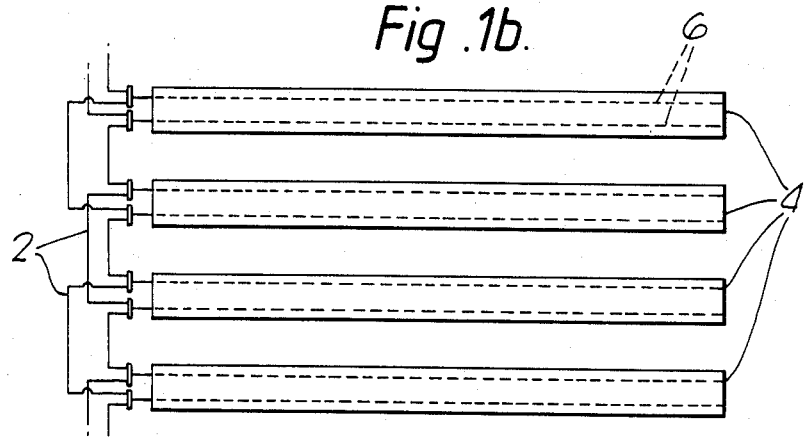

In each of the heaters shown in FIG. 1, the same reference numerals are used to identify the same components. Thus each heater comprises connection elements 2 and heater elements 4, the heater elements comprising electrodes 6 which extend along the length of the elements. The elements of the heater shown in FIG. 1a are arranged in a comb configuration, in which a pair of connection elements extends along an edge of the heater, and in which respective electrodes 6 of each heater element are connected to the connection elements at one end of the heater elements. The heater may be cut to length and width to suit the particular application.

The elements of the heater shown in FIG. 1b are again arranged in a comb configuration. However, individual pairs of connection elements are used to connect each adjacent pair of heater elements, the connection between heater element and connection elements being made by crimping.

Figure 1C:
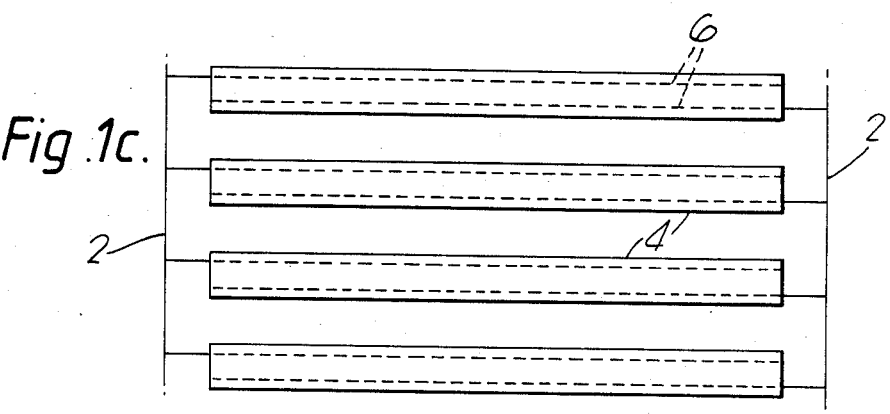

In the ladder configuration, shown in FIG. 1c, a connection element extends along each edge 8,10, with the heater elements between them, the electrodes of each heater element being connected to respective connection elements at opposite ends of the heater elements. This configuration can be arranged to be of lower profile than those of FIGS. 1a and b, since it is not necessary for electrodes and/or connection elements to cross over at the point of connection. A heater having a similarly low profile can be achieved using the configuration shown in FIG. 1d, in which a pair of connection elements is used to interconnect each adjacent pair of heater elements.

A preferred form of connection between the connection elements and a heater element of the heater shown in FIG. 1a is shown in FIG. 2. The connection elements 2 are doubly insulated: the outer insulation 20 is removed in the joint region, and the inner insulation 22 is removed from the elements at spaced apart regions. A loop 28 is formed in each stripped connection element, to which respective electrodes 30,32 of the heater element 34 are connected by crimps 36. An insulator place 38, suitably notched to fit over the connection elements, prevents the stripped portions of connection elements and/or the electrodes of the heater element from short circuiting. The joint is enclosed in an insulating housing 40, shown in dotted outline which may be a heat-shrinkable moulded part, or a gel-coated part.

FIG. 3 shows a cross section through a floor heater. The configuration of the heater elements is as shown in FIG. 1a, the cross-section being taken along the line A—A. The heater comprises heater elements 4 mounted on an aluminium sheet 30 to which an aluminium cover sheet 32 has been laminated, so as to sandwich the heater elements between the sheets. Rigid spacers 34 are provided between the heater elements such that the upper surface of the heater is substantially even. The lower surface of the heater is provided with a layer of resilient foam 36.

In the heater shown in FIG. 4, the support comprises strips 40 of a rigid polymeric material, such as a polyamide. The strips are hinged by means of a film 42 which is adhered to the surface of the strips. The film may comprise polymeric or metallic material. The heater elements 44 are laid in grooves in the strips of the support and held there by means of a layer of aluminium foil 46 which overlies the grooves.

FIG. 5 shows one element of a co-extruded heater according to the invention. The heater comprises a heater element 50 with electrodes 51,52 soldered to connection elements 53,54 respectively. Elements 53,54 are embedded in the heater support 55, by extrusion of the support around the elements. A sheet metal cover plate 56 is provided over the heater element 50 which lies in a groove 57 in the support 55 and acts as a mechanical protection for the heater element. A recess 58 is provided in the extruded support 55 to permit connection of the electrodes 51,52 to the connection elements 53,54. Subsequent to the soldered connection the recess 58 is filled with an epoxy resin (not shown).

Figure 6:
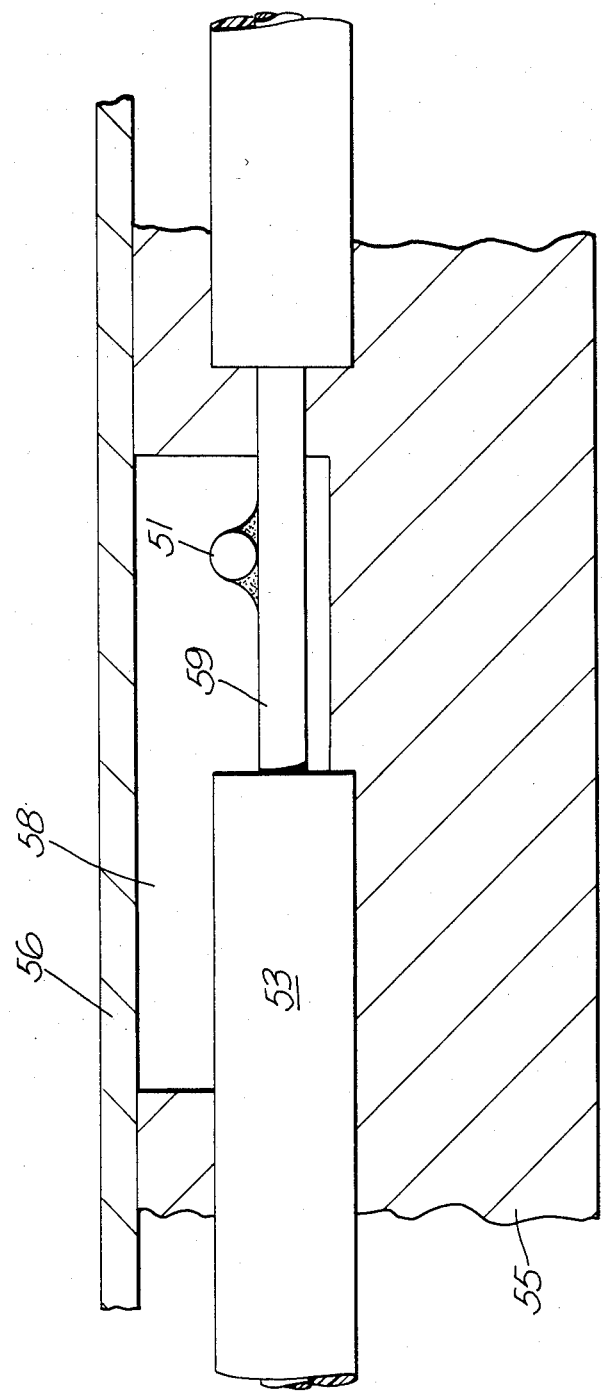
FIG. 6 shows a sectional side elevation through the heater of FIG 5.

FIG. 6 shows in detail the connection of the electrode 51 to the connection element 53. A short section 59 of the insulated connection element 53 is stripped in order to allow a soldered connection to the electrode 51 which has been similarly prepared. Subsequently the recess 58 is filled with epoxy resin and the assembly covered by the sheet metal cover plate 56.

Figure 7A:
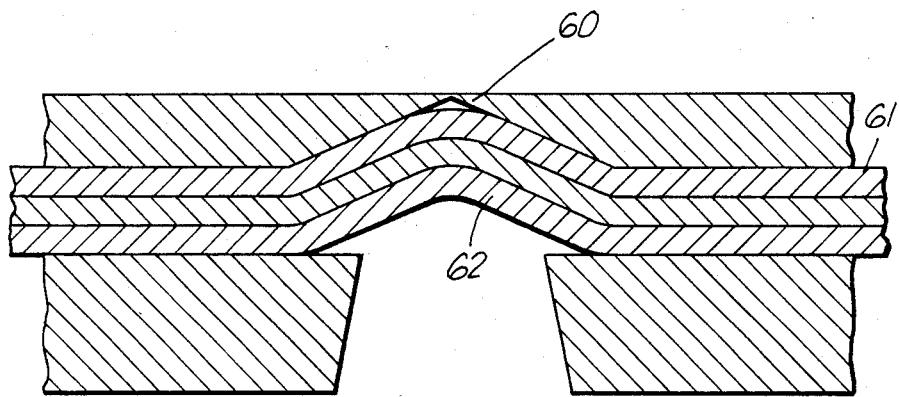
FIGS. 7a and 7b show sectional side elevations of the operations of the hinge mechanism.
Figure 7B:
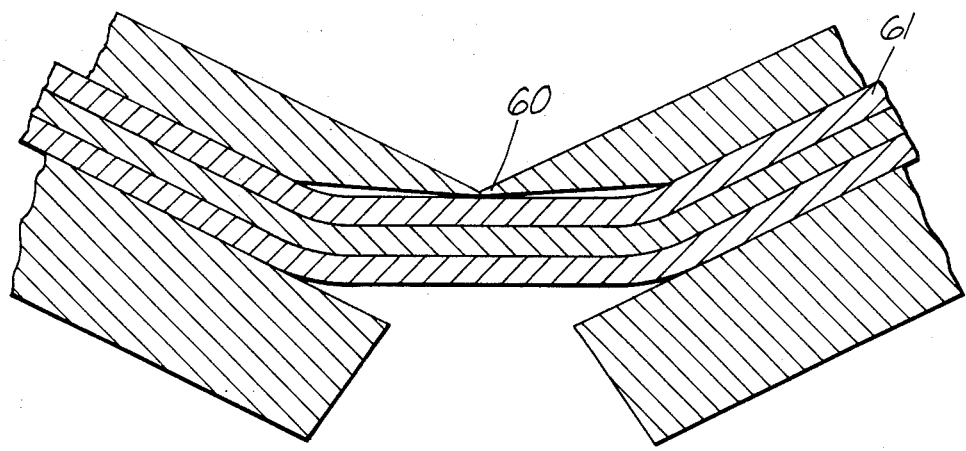

FIGS. 7a and 7b show details of the hinge produced by extrusion of the support around the connection elements. During the extrusion process a thinned region 60 is left in the support and the connection elements 61 are deformed so as to produce a kink 62 at the hinged region. On bending the hinge the thinned region 60 is deformed to permit the bending movement and the kink 62 is straightened out so that the assembly can be rolled up without placing undesirable tensile stresses on the connection elements or the support material.

We claim:

1. A flexible wall, floor or ceiling heater which is in the form of a sheet and which comprises:
   (a) first and second connection elements which can be connected to a source of electrical power;
   (b) a plurality of discrete, elongate, self-regulating electrical heater elements, each of which comprises:
      (i) a first elongate electrode which is connected to the first connection element,
      (ii) a second elongate electrode which is connected to the second connection element, and
      (iii) a plurality of resistive heating elements connected in parallel with each other between the first and second electrodes; and
   (c) a flexible support which is in the form of a sheet and to which the heater elements and the connection elements are secured in a substantially fixed spatial relationship in the plane of the sheet, with the heater elements being substantially parallel to each other and spaced apart from each other, and the connection elements being substantially at right angles to the heater elements.

2. A heater as claimed in claim 1, wherein each of the heater elements comprises a composition which exhibits PTC behaviour.

3. A heater as claimed in claim 2, wherein each of the resistive heating elements comprises a PTC conductive polymer composition.

4. A heater as claimed in claim 1, wherein each heater element comprises two wire electrodes embedded in a melt-extruded core of a PTC conductive polymer composition.

5. A heater as claimed in claim 1 wherein the connection elements are adjacent to each other and the connections between the connection elements and the electrodes of each heater are made at substantially the same point along the length of each heater.

6. A heater as claimed in claim 5 wherein the connections between the electrodes of each of the heater elements and the connection elements are at one end of the heater element.

7. A heater as claimed in claim 6, which has a comb configuration in which the connection elements define the backbone of the comb, and the heater elements define the teeth.

8. A heater as claimed in claim 1, wherein the connections between the electrodes of at least one of the heater elements and the respective connection elements are at opposite ends of the said heater elements.

9. A heater as claimed in claim 1, wherein the support comprises a sheet of material, having a principal surface on which the heater elements are supported.

10. A heater as claimed in claim 9, wherein the support comprises a laminate of two sheets of material, the heater elements being sandwiched between the sheets.

11. A heater as claimed in claim 10, wherein the support comprises spacers positioned between the heater elements, the spacers being dimensioned to ensure that the principal surfaces of the heater are substantially even.

12. A heater as claimed in claim 1, which comprises a layer of resilient material which provides a principal surface of the heater.

13. A heater as claimed in claim 1, which is sufficiently flexible to allow it to be formed into a roll.

14. A heater as claimed in claim 13, wherein the support comprises abutting sheets or strips of a relatively inflexible material, the sheets or strips being hinged along abutting edges.

15. A heater as claimed in claim 1, where the support has been extruded around the connection elements.

16. A heater as claimed in claim 15, wherein the support has a thinned region which can act as a hinge to permit flexing of the heater.

17. A heater as claimed in claim 16, wherein the connection elements are kinked or bent at the thinned region.

18. A heater as claimed in claim 1, wherein the heater element is provided with a sheet metal cover plate.

* * * * *